(12) United States Patent
Tao et al.

(10) Patent No.: US 11,488,586 B1
(45) Date of Patent: Nov. 1, 2022

(54) SYSTEM FOR SPEECH RECOGNITION TEXT ENHANCEMENT FUSING MULTI-MODAL SEMANTIC INVARIANCE

(71) Applicant: INSTITUTE OF AUTOMATION, CHINESE ACADEMY OF SCIENCES, Beijing (CN)

(72) Inventors: Jianhua Tao, Beijing (CN); Shuai Zhang, Beijing (CN); Jiangyan Yi, Beijing (CN)

(73) Assignee: INSTITUTE OF AUTOMATION, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 17/867,937

(22) Filed: Jul. 19, 2022

(30) Foreign Application Priority Data

Jul. 19, 2021 (CN) .......................... 202110815743.4

(51) Int. Cl.
*G10L 15/18* (2013.01)
*G10L 15/16* (2006.01)
*G10L 15/06* (2013.01)

(52) U.S. Cl.
CPC ........ *G10L 15/1815* (2013.01); *G10L 15/063* (2013.01); *G10L 15/16* (2013.01)

(58) Field of Classification Search
CPC .... G10L 15/1815; G10L 15/063; G10L 15/16
See application file for complete search history.

(56) References Cited

U.S. PATENT DOCUMENTS

| 2013/0283156 A1* | 10/2013 | Al Badrashiny ..... G06F 40/232 715/257 |
| 2018/0336900 A1 | 11/2018 | Zou et al. |
| 2020/0126538 A1 | 4/2020 | Han et al. |

FOREIGN PATENT DOCUMENTS

| CN | 108417202 A | 8/2018 |
| CN | 108885870 A | 11/2018 |

(Continued)

OTHER PUBLICATIONS

Sainath et al., An Attention-Based Joint Acoustic and Text on-device End-to-End Model., Google, Inc., USA, ICASSP 2020—2020 IEEE International Conference on Acoustics, Speech and Signal Processing (ICASSP), Apr. 9, 2020. pp. 7039-7043. (Year: 2020).*

(Continued)

*Primary Examiner* — Abul K Azad
(74) *Attorney, Agent, or Firm* — Westbridge IP LLC

(57) ABSTRACT

Disclosed is a system for speech recognition text enhancement fusing multi-modal semantic invariance, the system includes an acoustic feature extraction module, an acoustic down-sampling module, an acoustic feature extraction module, an acoustic down-sampling module, an encoder and a decoder fusing multi-modal semantic invariance; the acoustic feature extraction module is configured for frame-dividing processing of speech data, dividing the speech data into short-term audio frames with a fixed length, extracting thank acoustic features from the short-term audio frames, and inputting the acoustic features into the acoustic down-sampling module for down-sampling to obtain an acoustic representation; inputting the speech data into an existing speech recognition module to obtain input text data, and inputting the input text data into the encoder to obtain an (Continued)

input text encoded representation; inputting the acoustic representation and the input text encoded representation into the decoder to fuse.

7 Claims, 2 Drawing Sheets

(56) References Cited

FOREIGN PATENT DOCUMENTS

| | | | |
|---|---|---|---|
| CN | 110111783 A | 8/2019 | |
| CN | 110188343 A | 8/2019 | |
| CN | 110570845 A | 12/2019 | |
| CN | 108417202 B | 9/2020 | |
| CN | 111930900 A | 11/2020 | |
| CN | 111968622 A | 11/2020 | |
| CN | 112133287 A | 12/2020 | |
| CN | 112257437 A | 1/2021 | |
| CN | 112420028 A | 2/2021 | |
| CN | 112489616 A | 3/2021 | |
| CN | 112765323 A | 5/2021 | |
| CN | 112825248 A | 5/2021 | |
| CN | 113112987 A | 7/2021 | |
| EP | 1016985 A2 | 7/2000 | |
| WO | WO-2013142852 A1 * | 9/2013 | ............. G06F 17/21 |

OTHER PUBLICATIONS

Bai et al., Integrating Knowledge into End-to-End Speech Recognition from External Text-Only Data, Journal of Latex Class Files, vol. 14, No. 8, dated Aug. 31, 2015.

Dong et al.. Model Level Fusion Dimension Emotion Recognition Method Based on Transformer, Journal of Signal Processing, vol. 37, No. 5, pp. 885-892, dated May 31, 2021.

First Office Action issued in counterpart Chinese Patent Application No. 202110815743.4, dated Aug. 31, 2021.

Hori et al., Cycle-Consistency Training for End-to-End Speech Recognition, https://arxiv.org/abs/1811.01690v2, dated May 23, 2019.

Liu et al., Survey of multimodal deep learning. Application Research of Computers, Vo. 37, No. 6, pp. 1601-1614, dated Jun. 30, 2020.

Lohrenz et al., BLSTM-Driven Stream Fusion for Automatic Speech Recognition: Novel Methods and a Multi-Size Window Fusion Example, Interspeech 2020, pp. 26-30, Shanghai, China, dated Oct. 29, 2020.

Yang et al., Hybrid CTC/attention architecture for end-to-end multi-accent Mandarin speech recognition, Application Research of Computers, Vo. 38, No. 3, pp. 755-759, dated Mar. 31, 2021.

* cited by examiner

SYSTEM FOR SPEECH RECOGNITION TEXT ENHANCEMENT FUSING MULTI-MODAL SEMANTIC INVARIANCE

CROSS-REFERENCE TO RELATED APPLICATIONS

The present disclosure claims priority to Chinese Patent Application 202110815743.4, filed on Jul. 19, 2021, the entire content of which is incorporated herein by reference.

TECHNICAL FIELD

The application relates to the technical field of Chinese-English mixed speech recognition text enhancement, in particular to a system for speech recognition text enhancement fusing multi-modal semantic invariance.

BACKGROUND

Chinese-English mixed phenomenon refers to language switching in the process of speaking, which mainly includes two types: inter-sentence switching and intra-sentence switching. This phenomenon brings great challenges to speech recognition technology, which mainly includes accent problems caused by nonstandard pronunciation of speakers, more modeling units and higher complexity, coarticulation of different languages, difficulty in data collection, difficulty in data labeling and so on. With the development of the deep learning technology, especially the end-to-end model, monolingual speech recognition technology has been greatly improved. However, the end-to-end model can only use speech-text to train data, and the utilization of text data in the model is extremely limited, and a large amount of plain text data cannot be used directly, which limits the performance improvement of the model. In the actual system for speech recognition, the results initially recognized by the model are often further processed to improve the performance of the system for speech recognition.

Common processing techniques include language model re-scoring, language model fusion, etc. This method uses a large number of extra text corpus to train the language model, and then uses the language model to re-score the recognition results to improve the performance of the recognition system. However, this language model is trained separately, and it can learn general language information, but can't learn the error pattern of the recognition system, so it can't be optimized for a specific recognition system. Therefore, some end-to-end system for speech recognition text enhancements are used to solve this problem. This model takes recognition results of a system for speech recognition as input and annotation text as target. The purpose is to improve the accuracy of speech recognition by learning the error distribution of the recognition system and correcting the error part.

The patent with the publication number of CN112257437A discloses a method, a device, an electronic device and a storage medium for speech recognition text enhancement, in which the method includes: determining a recognized text of speech data to be enhanced by the text; inputting the recognized text, the user associated text of the speech data and/or the historical recognized text of the historical speech data of the speech data into the system for speech recognition text enhancement to obtain a text enhancement result output by the system for speech recognition text enhancement; wherein, the system for speech recognition text enhancement is obtained based on the sample recognition text of the sample speech data and its sample text enhancement result, as well as the sample user associated text and/or the sample history recognition text of the historical speech data of the sample speech data.

The patent published with the publication number of CN108417202B discloses a method and system for speech recognition. The speech recognition method includes: extracting acoustic features of speech data to be recognized; decoding the acoustic features into a phoneme array based on an acoustic-phoneme neural network model; and further decoding the phoneme array into a text sequence based on a phoneme-language neural network model. The system for speech recognition of the embodiment of the application, the phoneme array output from the acoustic-phoneme neural network model can be used as the input of the phoneme-language neural network model, which seamlessly connects the acoustic-phoneme neural network model and the phoneme-language neural network model, and provides another brand-new end-to-end speech recognition architecture as a whole.

Disadvantages of the Prior Art

Existing end-to-end system for speech recognition text enhancements only take the recognition results of the system for speech recognition as input and label text as target, without considering the corresponding acoustic information. Because the accuracy of contemporary system for speech recognition has been very high, most of the recognition results are correct, so the input and output of system for speech recognition text enhancement are mostly the same, only a few parts of recognition errors are different, and system for speech recognition text enhancement is to learn this difference. At the same time, due to the powerful modeling ability of neural network, the existing end-to-end system for speech recognition text enhancement is very easily overfitting, which requires a large amount of training data and does not fuse the semantic similarity between acoustic modal and text modal. It can't be applied to Chinese-English mixed speech recognition, and the model training is difficult and the error rate is high.

SUMMARY

In view of the above, a first aspect of the application provides a system for speech recognition text enhancement fusing multi-modal semantic invariance, the system includes: an acoustic feature extraction module, an acoustic down-sampling module, an encoder and a decoder fusing multi-modal semantic invariance; the acoustic feature extraction module is configured for frame-dividing processing of speech data, dividing the speech data into short-term audio frames with a fixed length, extracting thank acoustic features from the short-term audio frames, and inputting the acoustic features into the acoustic down-sampling module for down-sampling to obtain an acoustic representation; inputting the speech data into an existing speech recognition module to obtain input text data, and inputting the input text data into the encoder to obtain an input text encoded representation; inputting the acoustic representation and the input text encoded representation into the decoder to fuse, to obtain a decoded representation by performing similarity constraint by acoustic modal and text modal representations.

Optionally, the system for speech recognition text enhancement further includes inputting the decoded representation into a softmax function to obtain a target with a highest probability.

Optionally, a method for down-sampling the acoustic features is: obtaining a sequence of down-sampled acoustic features, which is the acoustic representation, by splicing the acoustic features.

Optionally, a specific method for splicing the acoustic features is: splicing front and back 5 frames of the acoustic features, performing, by the fully connected mapping layer, dimensional conversion on the spliced acoustic features which are converted into a 256-dimensional feature vector.

Optionally, the system for speech recognition text enhancement further comprises a training data amplification module; the training data amplification module generates data and is configured for training the input text data of the system for speech recognition text enhancement, a specific method comprises the following steps:

S1: dividing speech data for training into 10 pieces, selecting nine pieces of the data to train the speech recognition module, and the remaining one piece recognizes a result;

S2: sequentially rotating the 10 pieces of the speech data for training using the method of the step S1, then obtaining recognition results of the 10 pieces of data as the input text data for training the system for speech recognition text enhancement; and S3: during recognition, adding perturbation to the 10 pieces of the speech data using a dropout model perturbation technique and a spectral text enhancement data perturbation technique, and recognizing for a plurality of times using different perturbation ratios, to obtain the input text data for training the system for speech recognition text enhancement.

Optionally, the system for speech recognition text enhancement further comprises a word embedding module; the word embedding module is configured for, before the input text data is inputted into the encoder, representing discrete input text data as a continuous feature vector representation, and inputting the continuous feature vector representation into the encoder.

Optionally, the system for speech recognition text enhancement further comprises adding positional encoding information to the continuous feature vector representation, modeling the time sequence information of inputting the input text data, to obtain an input text positional encoding sequence, and inputting the input text positional encoding sequence into the encoder.

Optionally, the encoder is formed by connecting a plurality of multi-head self-attention based modules with the same structure; two multi-head self-attention based modules are in residual connection with each other; the multi-head self-attention based module comprises two sub-parts, a first sub-part is a multi-head self-attention layer, followed by a second sub-part, which is a fully connected mapping layer, and each sub-part performs layer normalization operation; residual connection is carried out between the multi-head self-attention layer and the fully connected mapping layer.

Optionally, the system for speech recognition text enhancement further comprises a high-dimensional representation module for annotating a target sequence, configured for carrying out word embedding representation on an annotation target text corresponding to the input text data, inputting the word embedding representation into the multi-head self-attention based module to obtain a high-dimensional representation of the target sequence, and the high-dimensional representation is used as a query vector; the multi-head self-attention based module has the same structure with the multi-head self-attention based module of the encoder.

Optionally, a specific method comprises:
representing the annotation target text corresponding to the input text data as a continuous feature vector of the target text using a word embedding module;
adding positional encoding information to the continuous feature vector of the target text, modeling time sequence information of the feature vector, to obtain a target text positional encoding sequence;
inputting the target text positional encoding sequence into the multi-head self-attention based module to obtain the high-dimensional representation of the target sequence.

Optionally, inputting the acoustic representation and the input text encoded representation into the decoder as an acoustic key and acoustic value set, a text key and text value set to be queried;
using the query vector to perform an element-wise cosine distance calculation on the acoustic key set and the text key set, to obtain an acoustic attention score and a text attention score according to the size of the distance;
using the acoustic attention score to perform weighted average on the acoustic value set to obtain an acoustic context vector representation;
using the text attention score to perform weighted average on the text value set to obtain a text context vector representation;
performing element-wise similarity constraint on the acoustic context vector representation and the text context vector representation, to obtain the similarity loss of two modal signal representations;
performing dimensional conversion on the acoustic context vector representation and the text context vector representation through the fully connected mapping layer, and a final decoded representation is obtained through the similarity loss.

Compared with the prior art, the above-mentioned technical solutions provided in the embodiments of the present application have the following advantages:

the solution provided by the embodiments of the present application adds more prior information to the system for speech recognition text enhancement by fusing acoustic information, it is used to assist the text enhancement process by fusing cross-modal semantic invariance constraint loss, so as to reduce the dependence of the model on data and improve the performance of the model, which is suitable for Chinese-English mixed speech recognition problems.

DETAILED DESCRIPTION OF THE EMBODIMENTS

Figure 1:
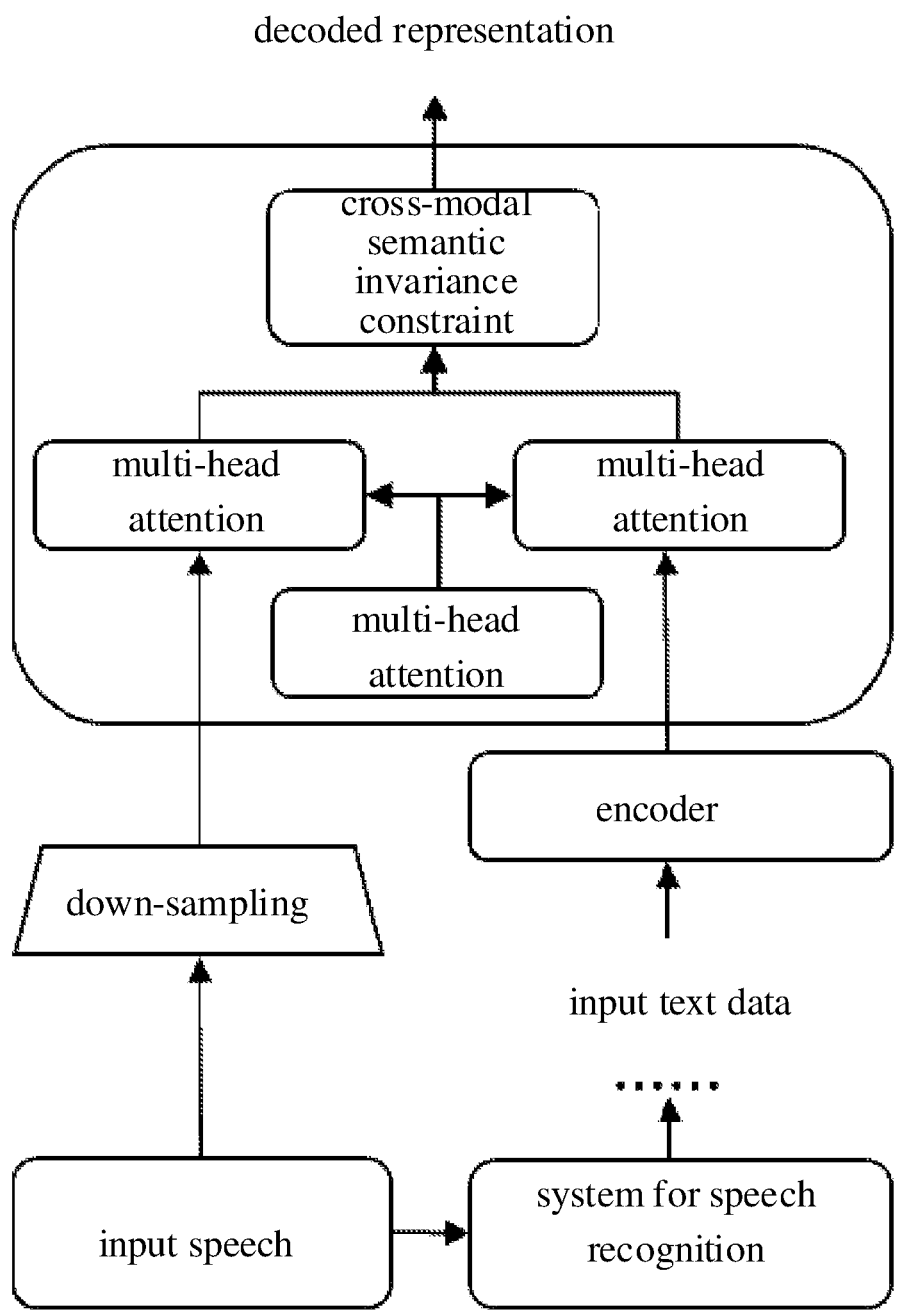
FIG. 1 is a structural diagram of a system for speech recognition text enhancement fusing multi-modal semantic invariance provided an embodiment of the present application.

Exemplary embodiments, examples of which are shown in the drawings, will be explained in detail here. When the following description relates to the drawings, the same numerals in different drawings denote the same or similar elements unless otherwise indicated. The embodiments described in the following exemplary embodiments are not representative of all embodiments which are consistent with the present application. They are only examples of devices and methods consistent with some aspects of the application as detailed in the appended claims.

As shown in FIG. 1, an embodiment of the present application provides a system for speech recognition text enhancement fusing multi-modal semantic invariance, and the system for speech recognition text enhancement specifically includes: an acoustic feature extraction module, an acoustic down-sampling module, an encoder and a decoder. The acoustic feature extraction module is configured for frame-dividing processing of speech data, dividing the speech data into short-term audio frames with a fixed length, extracting thank acoustic features from the short-term audio frames, and inputting the acoustic features into the acoustic down-sampling module for down-sampling to obtain an acoustic representation; inputting the speech data into an existing speech recognition module to obtain input text data, and inputting the input text data into the encoder to obtain an input text encoded representation; inputting the acoustic representation and the input text encoded representation into the decoder to fuse, to obtain a decoded representation; inputting the decoded representation into the softmax function to obtain the target with a highest probability.

The method for down-sampling the acoustic features is obtaining a sequence of down-sampled acoustic features, namely, the acoustic representation, by splicing the acoustic features.

The specific method for splicing the acoustic features is that splicing the front and back 5 frames of the acoustic features, performing, by a fully connected mapping layer, dimensional conversion on the spliced acoustic features which are converted into a 256-dimensional feature vector.

The system for speech recognition text enhancement further includes a training data amplification module; the training data amplification module generates data and is configured for training input text data of the system for speech recognition text enhancement.

Figure 2:
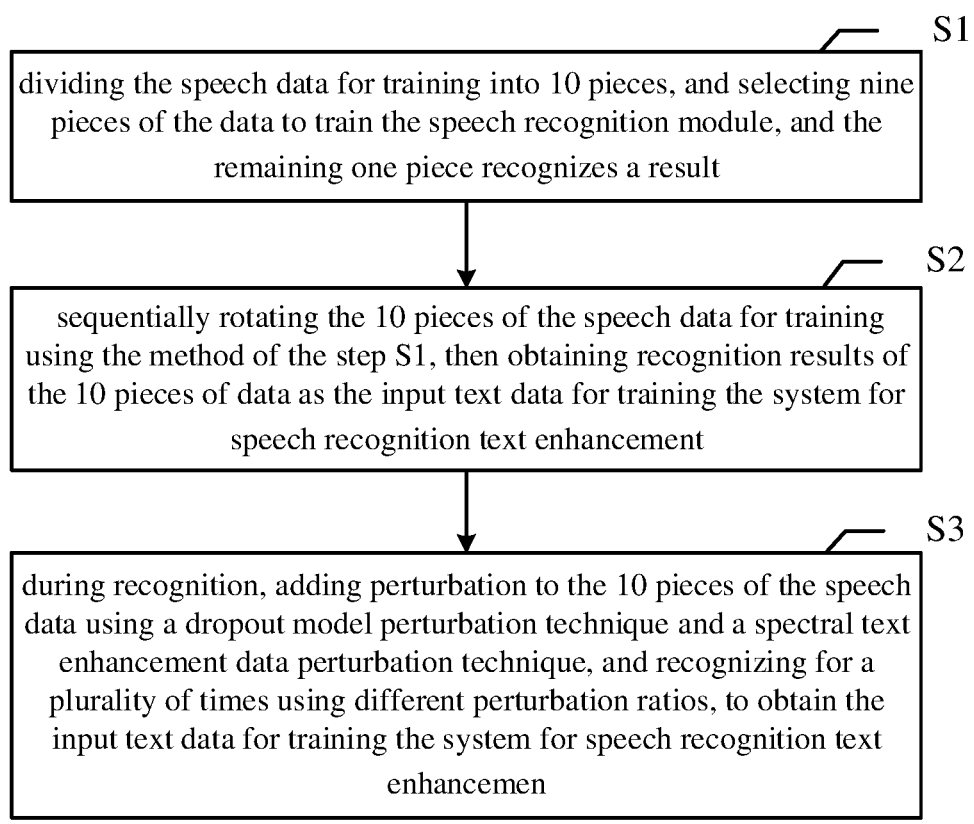
FIG. 2 schematically shows a schematic diagram of a method for training the input text data of the system for speech recognition text enhancement according to an embodiment of the present application.

As shown in FIG. 2, an embodiment of the present application provides a method for training the input text data of the system for speech recognition text enhancement. The specific method for training the input text data of the system for speech recognition text enhancement includes the following steps:

S1: dividing the speech data for training into 10 pieces, and selecting nine pieces of the data to train the speech recognition module, and the remaining one piece recognizes the result;

S2: sequentially rotating the 10 pieces of the speech data for training using the method of the step S1, then obtaining recognition results of the 10 pieces of data as the input text data for training the system for speech recognition text enhancement; and S3: during recognition, adding perturbation to the 10 pieces of the speech data using a dropout model perturbation technique and a spectral text enhancement data perturbation technique, and recognizing for a plurality of times using different perturbation ratios, to obtain the input text data for training the system for speech recognition text enhancement.

Optionally, during recognition, a dropout model perturbation technique is used to add perturbation to 5 pieces in the 10 pieces of the speech data, a spectral text enhancement data perturbation technique is used to add perturbation to the other 5 pieces in the 10 pieces of the speech data, and different perturbation ratios are used to recognize for a plurality of times, to obtain the input text data for training the system for speech recognition text enhancement.

The system for speech recognition text enhancement further includes a word embedding module, the word embedding module is configured for before the input text data is inputted into the encoder, representing discrete input text data as a continuous feature vector representation and inputting the continuous feature vector representation into the encoder.

The system for speech recognition text enhancement further includes adding positional encoding information to the continuous feature vector representation, modeling the time sequence information of inputting the input text data, to obtain an the input text positional encoding sequence, and inputting the input text positional encoding sequence into the encoder.

The encoder is formed by connecting a plurality of multi-head self-attention based modules with the same structure. Two multi-head self-attention based modules are in residual connection with each other.

The multi-head self-attention based module includes two sub-parts, a first sub-part is a multi-head self-attention layer, followed by a second sub-part, which is a fully connected mapping layer, and each sub-part performs layer normalization operation. Residual connection is carried out between the multi-head self-attention layer and the fully connected mapping layer.

The system for speech recognition text enhancement further includes a high-dimensional representation module for annotating a target sequence, which carries out word embedding representation on an annotation target text corresponding to the input text data, and inputs the word embedding representation into the multi-head self-attention based module to obtain a high-dimensional representation of the target sequence, and the high-dimensional representation is used as a query vector.

The Specific Method Includes:

representing the annotation target text corresponding to the input text data as a continuous feature vector of the target text using the word embedding module;

adding positional encoding information to the continuous feature vector of the target text, modeling the time sequence information of the feature vector, to obtain a target text positional encoding sequence;

inputting the target text positional encoding sequence into the multi-head self-attention based module to obtain a high-dimensional representation of target sequence.

A specific method for inputting the acoustic representation and the input text encoded representation into the decoder for fusion to obtain a decoded representation includes:

inputting the acoustic representation and the input text encoded representation into the decoder as an acoustic key and acoustic value set, a text key and text value set to be queried;

performing an element-wise cosine distance calculation on the acoustic key set and the text key set using the query vector, to obtain an acoustic attention score and a text attention score according to the size of the distance;

performing weighted average on the acoustic value set to obtain an acoustic context vector representation using the acoustic attention score;

performing weighted average on the text value set to obtain a text context vector representation using the text attention score;

performing element-wise similarity constraint on the acoustic context vector representation and the text context vector representation, to obtain the similarity loss of two modal signal representations;

performing dimensional conversion on the acoustic context vector representation and the text context vector representation through the fully connected mapping layer, and a final decoded representation is obtained through the similarity loss mentioned above.

Embodiments

As shown in FIG. 1, a system for speech recognition text enhancement fusing multi-modal semantic invariance includes: an acoustic feature extraction module, an acoustic down-sampling module, an encoder and a decoder. The acoustic feature extraction module is configured for frame-dividing processing of speech data, dividing the speech data into short-term audio frames with a fixed length, extracting thank acoustic features from the short-term audio frames, and inputting the acoustic features into the acoustic down-sampling module for down-sampling to obtain an acoustic representation; inputting the speech data into an existing speech recognition module to obtain input text data, and inputting the input text data into the encoder to obtain an input text encoded representation; inputting the acoustic representation and the input text encoded representation into the decoder for fusion to obtain a decoded representation; inputting the decoded representation into the softmax function to obtain the target with the highest probability.

In the extraction of the acoustic features, the speech data provided by the Chinese-English Mixed Speech Recognition Challenge of ASRU Conference in 2019 is used, in which the training set data is about 200 hours, the verification set data and the test set data are 20 hours respectively, data of which are all Chinese-English mixed way speech data with a sampling rate of 16K. Firstly, the speech data is divided into frames, in which every 25 milliseconds equal one frame, and there is an overlap of 10 milliseconds between frames. After framing, 80-dimensional thank features are extracted as acoustic features.

The acoustic down-sampling module is configured for down-sampling the acoustic features only, in order to avoid encoding the acoustic features and reduce overhead of the model. A method for splicing the acoustic features is to splice the features of the front and back five frames, perform dimensional conversion on the spliced acoustic features which is converted into a 256-dimensional feature vector by a fully connected mapping layer, and the number of acoustic feature frames can be reduced to $\frac{1}{10}$ of the original. The number of acoustic frames is effectively reduced, and mismatch in the length between the text and the acoustic features is reduced, which is beneficial to subsequent information fusion.

The word embedding module and the encoder are configured for: firstly, the word embedding module is configured for representing input text data in a 256-dimensional continuous feature vector representation; positional encoding information is added to the continuous feature vector representation, and the time sequence information of inputting the input text data is modeled, and then inputted into the encoding module based on multi-head self-attention mechanism. The encoding module is formed by stacking six sub-modules with the same structure. Each encoding module includes two sub-parts, one is a multi-head self-attention layer, followed by a fully connected mapping layer, the number of heads is set to 4, the dimension of the fully connected layer is 1024, GLU is used as the activation function, each sub-layer performs layer normalization operation, residual connection is carried out between the two sub-modules, and a dropout operation is used for the self-attention layer and the full-connection layer with a parameter of 0.1. The continuous feature vector representation is converted into a high-dimensional feature representation through the encoder; the multi-head attention mechanism extends the traditional attention mechanism and makes it have multiple headers, so that each header has a different role when participating in the encoder output. Specifically, multi-head attention independently calculate attentions h times, and then connect their outputs to another linear projection. The attention formula is as follows:

$$\text{Attention}(Q,K,V) = \text{soft max}(QK^T/d_k)V$$

in which, Q, K and V represent the set of inputted queries, keys and values, respectively, the formulas of which are as follows:

$$Q = W_q X; K = W_k X; V = W_v X$$

Through the text encoder, the continuous feature vector representation is converted into the high-dimensional feature representation.

A high-dimensional representation module for annotating a target sequence and the decoder are configured that: in the decoder section, the acoustic representation and the input text encoded representation are fused and inputted into the decoder to obtain a decoded representation. The high-dimensional representation module for annotating the target sequence and the decoder are both composed of six identical multi-head attention based modules.

The high-dimensional representation module for annotating the target sequence is configured for, carrying out word embedding representation on the annotation target text corresponding to the input text data to obtain a 256-dimensional vector representation; then adding positional encoding information to the 256-dimensional vector representation, and modeling the time sequence information of the feature sequence; the word embedded representation is inputted into the multi-head self-attention based module to obtain a high-dimensional representation as a query vector; in this part of the structure, the number of heads of is set to 6, the dimension is 256, and the dimension of the fully connected layer is 1024. The activation function uses GLU, each sub-layer performs layer normalization operation, residual connection is carried out between two sub-layers, and the dropout operation is used for the self-attention layer and the fully connected layer, with a parameter of 0.1;

inputting the acoustic representation and the input text encoded representation into the decoder as an acoustic key and acoustic value set, a text key and text value set to be queried;

using the query vector to perform an element-wise cosine distance calculation on the acoustic key set and the text key set, to obtain an acoustic attention score and a text attention score according to the size of the distance;

using the acoustic attention score to perform weighted average on the acoustic value set to obtain an acoustic context vector representation;

using the text attention score to perform weighted average on the text value set to obtain a text context vector representation;

performing element-wise similarity constraint on the acoustic context vector representation and the text context vector representation, in which L1 and L2 norm loss is used as the constraint, averaging the two losses, and the similarity loss of two modal signal representations is obtained.

performing dimensional conversion on the acoustic context vector representation and the text context vector representation through the fully connected mapping layer, and a final decoded representation is obtained through the similarity loss mentioned above; and the obtained decoded representation is inputted into a softmax function to obtain the target with the highest probability.

It should be understood that although the terms first second third etc. may be used in the present application to describe various information such information should not be limited to these terms. These terms are only used to distinguish the same type of information from each other. For example without departing from the scope of the present application the first information may also be referred to as the second information and similarly the second information may also be referred to as the first information. Depending on the context, the word "if" as used herein can be interpreted as "when" or "when" or "in response to determination".

Although this specification contains numerous specific implementation details these are not to be construed as limiting the scope of any application or the scope claimed but are intended primarily to describe the features of specific embodiments of a particular application. Certain features described within the specification in multiple embodiments may also be combined in a single embodiment. On the other hand the various features described in a single embodiment may also be implemented separately in multiple embodiments or in any suitable sub-combination. Further, while features may function in certain combinations as described above and even initially so claimed, one or more features from the claimed combination in some cases may be removed from the combination and the claimed combination may point to a sub-combination or a variant of a sub-combination.

Similarly while operations are depicted in a particular order in the drawings this should not be construed as requiring that these operations be performed in the particular order or sequential order shown or that all illustrated operations be performed to achieve the desired results. In some cases, multitasking and parallel processing may be advantageous. Further, the separation of the various system modules and components in the above embodiments should not be understood as requiring such separation in all embodiments, and it should be understood that the described program components and systems may generally be integrated together in a single software product or packaged into multiple software products.

Thus specific embodiments of the subject matter have been described. Other embodiments are within the scope of the appended claims. In some cases the actions described in the claims may be performed in a different order and still achieve the desired result. Further the processes depicted in the drawings are not necessarily in the particular order or sequential order shown to achieve the desired results. In some implementations, multitasking and parallel processing may be advantageous.

The foregoing is only a preferred embodiment of the present application and is not intended to limit the present application. Any modifications, equivalents, modifications and so on made within the spirit and principles of the present application should be included within the scope of protection of the present application.

What is claimed is:

1. A system for speech recognition text enhancement fusing multi-modal semantic invariance, comprising:
   an acoustic feature extraction module, an acoustic down-sampling module, an encoder and a decoder fusing multi-modal semantic invariance; wherein the acoustic feature extraction module is configured for frame-dividing processing of speech data, dividing the speech data into short-term audio frames with a fixed length, extracting thank acoustic features from the short-term audio frames, and inputting the acoustic features into the acoustic down-sampling module for down-sampling to obtain an acoustic representation; inputting the speech data into an existing speech recognition module to obtain input text data, and inputting the input text data into the encoder to obtain an input text encoded representation; inputting the acoustic representation and the input text encoded representation into the decoder to fuse, to obtain a decoded representation by performing similarity constraint by acoustic modal and text modal representations;

the encoder is formed by connecting a plurality of multi-head self-attention based modules with the same structure; two multi-head self-attention based modules are in residual connection with each other;

the multi-head self-attention based module comprises two sub-parts, a first sub-part is a multi-head self-attention layer, followed by a second sub-part, which is a fully connected mapping layer, and each sub-part performs layer normalization operation; residual connection is carried out between the multi-head self-attention layer and the fully connected mapping layer;

the system for speech recognition text enhancement further comprises a high-dimensional representation module for annotating a target sequence, configured for carrying out word embedding representation on an annotation target text corresponding to the input text data, inputting the word embedding representation into the multi-head self-attention based module to obtain a high-dimensional representation of the target sequence, and the high-dimensional representation is used as a query vector;

a specific method comprises:
representing the annotation target text corresponding to the input text data as a continuous feature vector of the target text using a word embedding module;
adding positional encoding information to the continuous feature vector of the target text, modeling time sequence information of the feature vector, to obtain a target text positional encoding sequence;
inputting the target text positional encoding sequence into the multi-head self-attention based module to obtain the high-dimensional representation of the target sequence;
a specific method for inputting the acoustic representation and the input text encoded representation into the decoder to fuse, to obtain the decoded representation by performing similarity constraint by the acoustic modal and text modal representations comprises:
inputting the acoustic representation and the input text encoded representation into the decoder as an acoustic key and acoustic value set, a text key and text value set to be queried;
performing an element-wise cosine distance calculation on the acoustic key set and the text key set using the query vector, to obtain an acoustic attention score and a text attention score according to the size of the distance;
performing weighted average on the acoustic value set to obtain an acoustic context vector representation using the acoustic attention score;
performing weighted average on the text value set to obtain a text context vector representation using the text attention score;
performing element-wise similarity constraint on the acoustic context vector representation and the text context vector representation, to obtain the similarity loss of two modal signal representations; and performing dimensional conversion on the acoustic context vector representation and the text context vector representation through the fully connected mapping layer, and a final decoded representation is obtained through the similarity loss.

2. The system for speech recognition text enhancement fusing multi-modal semantic invariance according to claim 1, wherein the system for speech recognition text enhancement further comprises inputting the decoded representation into a softmax function to obtain a target with a highest probability.

3. The system for speech recognition text enhancement fusing multi-modal semantic invariance according to claim 1, wherein a method for down-sampling the acoustic features comprises: obtaining a sequence of down-sampled acoustic features, which is the acoustic representation, by splicing the acoustic features.

4. The system for speech recognition text enhancement fusing multi-modal semantic invariance according to claim 3, wherein a specific method for splicing the acoustic features comprises: splicing front and back 5 frames of the acoustic features, performing, by the fully connected mapping layer, dimensional conversion on the spliced acoustic features which are converted into a 256-dimensional feature vector.

5. The system for speech recognition text enhancement fusing multi-modal semantic invariance according to claim 1, wherein the system for speech recognition text enhancement further comprises a training data amplification module; the training data amplification module generates data and is configured for training the input text data of the system for speech recognition text enhancement, a specific method comprises following steps:

S1: dividing speech data for training into 10 pieces, selecting nine pieces of the data to train the speech recognition module, and the remaining one piece recognizes a result;

S2: sequentially rotating the 10 pieces of the speech data for training using the method of the step S1, then obtaining recognition results of the 10 pieces of data as the input text data for training the system for speech recognition text enhancement; and S3: during recognition, adding perturbation to the 10 pieces of the speech data using a dropout model perturbation technique and a spectral text enhancement data perturbation technique, and recognizing for a plurality of times using different perturbation ratios, to obtain the input text data for training the system for speech recognition text enhancement.

6. The system for speech recognition text enhancement fusing multi-modal semantic invariance according to claim 5, wherein the system for speech recognition text enhancement further comprises a word embedding module;

the word embedding module is configured for, before the input text data is inputted into the encoder, representing discrete input text data as a continuous feature vector representation, and inputting the continuous feature vector representation into the encoder.

7. The system for speech recognition text enhancement fusing multi-modal semantic invariance according to claim 6, wherein the system for speech recognition text enhancement further comprises adding positional encoding information to the continuous feature vector representation, modeling the time sequence information of inputting the input text data, to obtain an input text positional encoding sequence, and inputting the input text positional encoding sequence into the encoder.

* * * * *